United States Patent
Iijima et al.

(10) Patent No.: US 7,384,520 B2
(45) Date of Patent: Jun. 10, 2008

(54) METHOD FOR MANUFACTURING HYBRID CARBON NANOTUBE

(75) Inventors: Sumio Iijima, Aichi (JP); Shunji Bandow, Aichi (JP); Kazutomo Suenaga, Ibaraki (JP); Kaori Hirahara, Aichi (JP)

(73) Assignees: Japan Science and Technology Corporation, Saitama (JP); NEC Corporation, Tokyo (JP)

( * ) Notice: Subject to any disclaimer, the term of this patent is extended or adjusted under 35 U.S.C. 154(b) by 713 days.

(21) Appl. No.: 10/469,172

(22) PCT Filed: Feb. 27, 2002

(86) PCT No.: PCT/JP02/01795

§ 371 (c)(1),
(2), (4) Date: Nov. 19, 2003

(87) PCT Pub. No.: WO02/068332

PCT Pub. Date: Sep. 6, 2002

(65) Prior Publication Data

US 2004/0065559 A1    Apr. 8, 2004

(30) Foreign Application Priority Data

Feb. 27, 2001   (JP)   ............... 2001-052847

(51) Int. Cl.
*H05F 3/00*   (2006.01)
*C25B 1/00*   (2006.01)
*C25B 7/00*   (2006.01)
*C01B 31/00*  (2006.01)
*C09C 1/56*   (2006.01)

(52) U.S. Cl. ............... 204/164; 204/450; 205/334; 423/445 R; 423/460; 977/744

(58) Field of Classification Search ............ 423/445 R, 423/460; 977/744; 204/164, 450; 205/334
See application file for complete search history.

(56) References Cited

U.S. PATENT DOCUMENTS 6,090,363 A * 7/2000 Green et al. ............. 423/447.1

FOREIGN PATENT DOCUMENTS

JP   2002-097009   4/2002
WO   WO 96/09246 A1 *  3/1996

OTHER PUBLICATIONS

Sloan et al.,, "The Opening and Filling of Single Walled Carbon Nanotubes (SWNTs)", Chem. Commun. (no month, 1998), vol. 3, pp. 347-348.*
Sloan et al., "Selective Deposition of UCl4 and (KCl)x(UCl4)y Inside Carbon Nanotubes Using Eutectic and Noneutectic Mixtures of UCl4 with KCl", J. of Solid State Chem. (no month, 1998), vol. 140, pp. 83-90.*
Li et al., "Nanoscale Electroless Metal Deposition in Aligned Carbon Nanotubes", Chem. Mater. (no month, 1998), vol. 10, pp. 1963-1967.*
Hirahara et al., "One-Dimensional Metallofullerene Crystal Generated Inside Single-Walled Carbon Nanotubes", Physical Review Letters, vol. 85, No. 25, Dec. 18, 2000, pp. 5384-5387.*
S. C. Tsang et al., "A simple chemical method of opening and filling carbon nanotubes", Nature, vol. 372, pp. 159 to 162, 1994, no month.
Jeremy Sloan et al., "The opening and filling of single walled carbon nanotubes (SWTs)", Chemical Communications, No. 3, pp. 347 to 348, 1998, no month.
J. Sloan et al., "Selective Deposition of $UCl_4$ and $(KCl)_x (UCl_4)_y$ inside Carbon Nanotubes Using Eutectic and Noneutectic Mixtures of $UCl_4$ with KCl", Journal of Solid State Chemistry, vol. 140, No. 1, pp. 83 to 90, 1998, no month.
David E. Luzzi, "Synthesis Structure and Electronic Properties of Fullerene and Non-fullerene Peapods", Tsukuba Symposium on Carbon Nanotube in Commemoration of the 10th Anniversary of its Discovery, abstracts, p. 8, Oct. 3, 2001.
K. Hirahara et al., "One-Dimensional Metallofullerene Crystal Generated Inside Single-Walled Carbon Nanotubes", Physical Review Letters, vol. 85, No. 25, pp. 5384 to 5387, Dec. 18, 2000.

* cited by examiner

*Primary Examiner*—Edna Wong
(74) *Attorney, Agent, or Firm*—Wenderoth, Lind & Ponack, L.L.P.

(57)   ABSTRACT

The invention of present application relates to a method for enabling a hybrid carbon nanotube having an arbitrary composition ratio to be readily manufactured, and the hybrid carbon nanotube. A method for manufacturing a hybrid carbon nanotube, which comprises immersing a carbon nanotube having open pores in a solution having a dopant substance dissolved therein to effect a doping reaction, thereby preparing a hybrid carbon nanotube comprising a carbon nanotube and a dopant substance introduced therein.

5 Claims, No Drawings

METHOD FOR MANUFACTURING HYBRID CARBON NANOTUBE

TECHNICAL FIELD

The invention of the present application relates to a method for manufacturing a hybrid carbon nanotube. More peculiarly, the invention of the present application relates to a method for enabling a hybrid carbon nanotube having an arbitrary composition ratio to be readily manufactured, and the hybrid carbon nanotube.

BACKGROUND ART

A hybrid carbon nanotube comprising a dopant substance introduced into a hollow cylindrical space of the carbon nanotube has been noticed as a novel nano-structure substance that would be potentially utilized in various fields such as information and communication and chemical industry. In the method for manufacturing the hybrid carbon nanotube that has been proposed by the inventors of the present application (Japanese Patent Application No. 2000-286109), a dopant substance is introduced into the carbon nanotube as a gas.

However, since the dopant substance is introduced into the carbon nanotube after vaporizing it by taking advantage of a vapor phase reaction in the method as described above, the dopant substance to be easy for handling in the vapor phase has been preferable. Accordingly, control of vaporization conditions has been quite difficult when a substance that cannot be readily vaporized has been selected as the dopant substance. In addition, since the reaction rate for doping is determined only by the vapor pressure of the dopant substances, the proportion of introduction thereof has been determined only by the vapor pressure ratios among the respective dopant substances when two kinds or more of the dopant substances are introduced into the tube. Consequently, it was difficult to manufacture the hybrid carbon nanotube in which the dopant substances are introduced in arbitrary composition ratios.

Accordingly, the subject of the invention of the present application performed by considering the situations as described above is to solve the problems in the conventional art, and to provide a method for readily manufacturing the hybrid carbon nanotube having an arbitrary composition ratio, and such hybrid carbon nanotube.

DISCLOSURE OF INVENTION

The invention of the present application for solving the problems above provides the following inventions.

That is, firstly, the invention of the present application provides a method for manufacturing a hybrid carbon nanotube, which comprises immersing a carbon nanotube having open pores in a solution containing a dopant substance dissolved therein to effect a doping reaction, thereby preparing a hybrid carbon nanotube comprising the dopant substance introduced into the carbon nanotube.

The invention of the present application also provides, according to the above-mentioned first invention, secondly, the method for manufacturing a hybrid carbon nanotube in which the dopant substance is any one kind or a mixture of at least two kinds of organic substances, inorganic substances and metals, or a compound thereof; thirdly, the method for manufacturing a hybrid carbon nanotube in which when the dopant substance is a mixture of at least two kinds of substances, the hybrid carbon nanotube having an arbitrary composition ratio is obtained by controlling the mixing ratios of the dopant substances; fourthly, the method for manufacturing a hybrid carbon nanotube in which the reaction rate of the doping reaction is controlled by-controlling the environmental temperature; fifthly, the method for manufacturing a hybrid carbon nanotube in which the reaction rate of the doping reaction is controlled by taking advantage of an electrochemical reaction when the dopant substance is an ionizable substance; sixthly, the method for manufacturing the hybrid carbon nanotube in which only a target dopant substance is selectively introduced from a solution in which the dopant substance and other substances are dissolved.

The invention of the present application also provides, seventhly, the hybrid carbon nanotube manufactured by any one of the methods described above.

BEST MODE FOR CARRYING OUT THE INVENTION

Embodiments of the invention of the present application featured as described above will be described hereinafter.

In the method for manufacturing the hybrid carbon nanotube provided by the invention of the present application, a carbon nanotube having open pores is immersed in a solution containing a dopant substance dissolved therein to effect a doping reaction, thereby preparing a hybrid carbon nanotube comprising the dopant substance introduced into the carbon nanotube.

The carbon nanotube available as a starting material may have open pores. No restrictions are imposed on the diameter and length of the carbon nanotube, and arbitrary carbon nanotubes may be used depending on the internal volume and the object. The pores of the carbon nanotube may be formed, for example, by removing five-membered ring caps at the end of the carbon nanotube, and by cleaving C—C bonds on the tube wall of the carbon nanotube. The pores can be provided, for example, by the method for opening the pores in a single-wall carbon nanotube proposed by the inventors of the present application (Japanese Patent Application No. 2000-286095). Using a hybrid carbon nanotube having no open pores is not preferable since the yield of the hybrid carbon nanotube as a product becomes quite small.

The substances dissolved in a solvent and exist in the solution may be used as the dopant substances in the invention of the present application. Such substances available include any one kind or a mixture or a compound of at least two kinds of organic compounds, inorganic compounds and metals. Specific examples of the dopant substances include any one kind or a mixture of the like of at least two kinds of various carbon clusters such as fullerenes and super fullerenes and metal encapsulating fullerenes comprising metals encapsulated therein; various metals such as alkali metals and transition metals; organic compounds such as aromatic compounds; organometallic compounds represented by ferrocenes; organic metal complexes and inorganic metal complexes; and inorganic solid compounds.

Further, even thermally unstable substances may be used as the object of the invention of the present application, which could not be selected as the dopant substance in the conventional methods taking advantage of a vapor phase reaction, if the substances exist in a solution stably. Examples of such substances include biological substances (in an aqueous solution) such as DNAs, RNAs and cytochromes, and polymer materials (in an organic solvent solution) such as polyimide and acrylamide.

A solution is prepared by dissolving a required quantity of the dopant substance in a solvent. The dopant substance and solvent may be combined so that the target dopant substance is stably dissolved in the solvent. Although the carbon nanotube is chemically stable and is not corroded with the solvent, a biological substance as the dopant substance cannot be stably dissolved because it is denatured by dissolving in the organic solvent. Such combination is not suitable for introducing the target dopant substance into the carbon nanotube. However, even in such a case, the denatured biological substance is stably dissolved in the organic solvent, and can be introduced into the carbon nanotube. In other words, in the invention of the present application, dissolution means a state that a gaseous, liquid or solid dopant substance is mixed to form a homogeneous liquid phase in the solvent. Some changes such as formation of acid-base complexes, hydrogen bonds or production of new compounds may be caused between the solute and solvent, even when the solution system exhibits no chemical interactions between the solute and solvent. When some changes such as formation of the acid-base complexes, hydrogen bonds or production of new compounds are observed, the products after such changes serve as the dopant substances. It is needless to say that the target dopant substance may exist in the solution as the reaction product. On the other hand, since doping reactions to be described later can be hardly advanced when the dopant substance strongly interact with the solvent in the combination of the dopant substance and solvent, another solvent is desirably selected. Examples of the solvents that are appropriately selected for use include hydrocarbons such as benzene, toluene and xylene, inorganic solvents such as water and carbon disulfide, alcohols, ethers, acids and derivatives thereof.

The carbon nanotube having the open pores is immersed in a solution in which the dopant substance has been dissolved to effect the doping reaction. This doping reaction, that is, intake of the dopant substance into the carbon nanotube, is probably caused by inter-atomic forces. The environmental temperature for the doping reaction may be near room temperature, and is not required to be controlled. While the immersion time, that is, the reaction time, cannot be uniquely determined since it depends on the size and pore conditions of the carbon nanotube, and on the concentration of the solution or the like, the immersion time may be arbitrarily determined in the range of, for example, several tens minutes to several tens hours. The total quantity of the dopant substance is basically adjusted in the range up to a quantity that enables the dopant substance to be geometrically disposed in the carbon nanotube. The dopant substance can be densely packed within the carbon nanotube by extending the reaction time. The hybrid carbon nanotube into which the dopant substance is introduced through the open pores of a carbon nanotube is manufactured by the process as described above.

When the dopant substance is a mixture of at least two kinds of substances in the invention of the present application, a solution is prepared by mixing the dopant substances in a stoichiometric ratio so that a hybrid carbon nanotube having an arbitrary composition ratio depending on the stoichiometric ratio can be manufactured. Since the mixing ratio of the dopant substances can be simply and precisely controlled by quantitative measurements or the like, a hybrid carbon nanotube having a desired composition ratio can be more readily obtained than in the conventional method.

Further, in the invention of the present application, the method that the environmental temperature is controlled by cooling or heating is effectively provided as means for slowly or rapidly controlling the reaction rate of the doping reaction.

When the dopant substance is an ionizable substance, the reaction rate of the doping reaction can be accelerated by taking advantage of an electrochemical reaction. For example, the carbon nanotube is disposed at a plus (or minus) electrode side to negatively (or positively) ionize the dopant substance dissolved in an electrolyte solution, thereby allowing an electrostatic force in addition to a van der Waals force to serve as a driving force of the doping reaction. The dopant substance may be ionized by applying a voltage. The reaction rate of the doping reaction can be controlled by adjusting the applied voltage. Alternatively, only the target dopant substance can be selectively introduced into the carbon nanotube from the solution in which the dopant substance as well as other substances are dissolved, by taking advantage of an ionization potential difference between the dopant substance and the other substances.

The method of the invention of the present application is economically advantageous as compared with other methods, since a high temperatures is not required for vaporizing the dopant substance. Also, any dopant substances may be accepted so long as they are able to be dissolved in a solution, and the substances that have been difficult to handle by the conventional method can be selected as the dopant substance. Furthermore, the composition ratio can be simply and precisely controlled when at least two kinds of dopant substances are introduced into the carbon nanotube. In addition, the yield of the hybrid carbon nanotube is as high as about 95% that is comparable to the yield in the conventional method.

The hybrid carbon nanotube thus manufactured is endowed with various characteristics such as electric and magnetic characteristics or the like, or these characteristics are largely modified, depending on the encapsulated dopant substances. That is, this means that any dopant substances that have been hardly utilized may be selected depending on target functions, thereby making it possible to expect chemically or physically modified novel nano-structure substances to be created. Also, the method is also useful for creating novel functional materials in which organic substances are joined with inorganic substances. Furthermore, since the composition ratio is controlled to a target value in the hybrid carbon nanotube of the invention of the present application, characteristics of the hybrid carbon nanotube can be accurately investigated to make it possible to expect advanced potential possibilities.

Hereinafter, embodiments of the invention will be described in more detail with reference to examples.

EXAMPLE

Example 1

A solution for doping reaction was prepared using $C_{60}$ fullerene as a dopant substance and by dissolving it in toluene. A carbon nanotube after a pore opening treatment was immersed in this solution, followed by allowing to stand still for 48 hours at room temperature. Subsequently, the carbon nanotube was retrieved from the solution, and observed under a transmission electron microscope (TEM) after evaporating toluene off on a petri-dish, confirming that a hybrid carbon nanotube; $(C_{60})_n$@SWNT in which $C_{60}$ fullerene is introduced into a carbon nanotube was formed. The total yield of $(C_{60})_n$@SWNT was 95% or more.

Example 2

Two kinds of dopant substances of $C_{60}$ and $C_{70}$ fullerenes were used, and a solution for the doping reaction was prepared by dissolving the $C_{60}$ and $C_{70}$ fullerenes in toluene in a molecular ratio of 2:1. The carbon nanotube after a pore opening treatment was immersed in this solution, which was allowed to stand still for 48 hours at room temperature as in Example 1. The carbon nanotube retrieved from the solution was observed under a transmission electron microscope (TEM), confirming that a hybrid carbon nanotube; $((C_{60})_3 C_{70})_n$@SWNT in which the $C_{60}$ and $C_{70}$ fullerenes were introduced into the carbon nanotube in 3:1 ratio was formed. The total yield of $((C_{60})_3 C_{70})_n$@SWNT was 95% or more.

Example 3

Two kinds of $C_{60}$ fullerene and a metal encapsulating fullerene (La@$C_{82}$) were dissolved in an electrolyte solution in a molecular ratio of 1:1 to prepare a solution for the doping reaction. The carbon nanotube after a pore opening treatment was placed at the anode side and immersed in this solution to apply a voltage of about 1 V at room temperature. The carbon nanotube retrieved from the solution was observed under a transmission electron microscope (TEM), finding that the hybrid carbon nanotube; La@$C_{82}$@SWNT in which only La@$C_{82}$ fullerene is introduced into the carbon nanotube was formed.

Example 4

The carbon nanotube was retrieved from the solution by the same method as in Example 3, except that the applied voltage is changed to 2.5 V. The carbon nanotube was observed under a transmission electron microscope (TEM), confirming that the hybrid carbon nanotube; ($C_{60}$, La@$C_{82}$)@SWNT in which $C_{60}$ and La@$C_{82}$ fullerenes are introduced into the carbon nanotube was formed.

The ionization potential of the La@$C_{82}$ fullerene is different from the ionization potential of the $C_{60}$ fullerene. La@$C_{82}$ fullerene is ionized to La@$C_{82}^-$ ions at about 0.5 V while $C_{60}$ fullerene is ionized to $C_{60}^-$ ions at about 2.3 V. Consequently, it is considered that only the La@$C_{82}$ fullerene is selectively introduced into the carbon nanotube in Example 3, while a mixture of the La@$C_{82}$ and $C_{60}$ fullerenes is introduced into the carbon nanotube in Example 4.

It is needless to say that the invention is not restricted to the above examples, and various aspects are possible with respect to the details.

INDUSTRIAL APPLICABILITY

As hitherto described in detail, the invention provides a method for readily manufacturing a hybrid carbon nanotube having an arbitrary composition ratio, and the hybrid carbon nanotube.

The invention claimed is:

1. A method for manufacturing a hybrid carbon nanotube, which comprises immersing a carbon nanotube having open pores in a solution containing a dopant substance dissolved therein to effect a doping reaction, thereby preparing a hybrid carbon nanotube comprising the dopant substance introduced into the carbon nanotube, wherein the dopant substance is an ionizable substance, and the reaction rate of the doping reaction is controlled by taking advantage of an electrochemical reaction as the dopant substance is an ionizable substance.

2. The method for manufacturing a hybrid carbon nanotube according to claim 1, wherein the dopant substance is any one kind or a mixture of at least two kinds of organic substances, inorganic substances and metals, or a compound thereof.

3. The method for manufacturing a hybrid carbon nanotube according to claim 1 wherein, when the dopant substance is a mixture of at least two kinds of substances, the hybrid carbon nanotube has an arbitrary composition ratio and is obtained by controlling the mixing ratios of the dopant substances.

4. The method for manufacturing a hybrid carbon nanotube according to claim 1, wherein only the dopant substance is selectively introduced from the solution in which the dopant substance and other substances are dissolved.

5. The method for manufacturing a hybrid carbon nanotube according to claim 1, wherein the dopant substance is a fullerene, a metal encapsulating fullerene or a mixture thereof.

* * * * *